US009729003B1

(12) United States Patent
Chow

(10) Patent No.: US 9,729,003 B1
(45) Date of Patent: Aug. 8, 2017

(54) WIRELESS CHARGING DEVICE AND METHOD THEREOF

(71) Applicant: C-Corp International Co., Limited, Hong Kong (HK)

(72) Inventor: Matthew Kwok Leung Chow, Hong Kong (HK)

(73) Assignee: C-CORP INTERNATIONAL CO., LIMITED, Hong Kong (HK)

( * ) Notice: Subject to any disclaimer, the term of this patent is extended or adjusted under 35 U.S.C. 154(b) by 0 days.

(21) Appl. No.: 15/438,722

(22) Filed: Feb. 21, 2017

Related U.S. Application Data

(60) Provisional application No. 62/437,647, filed on Dec. 21, 2016.

(51) Int. Cl.
*H02J 7/00* (2006.01)
*H02J 7/02* (2016.01)
*H04B 5/00* (2006.01)

(52) U.S. Cl.
CPC ............ *H02J 7/025* (2013.01); *H04B 5/0087* (2013.01)

(58) Field of Classification Search
CPC ........................................ H02J 7/025
USPC .................................... 320/108, 112
See application file for complete search history.

(56) References Cited

U.S. PATENT DOCUMENTS 7,791,311 B2 * 9/2010 Sagoo ..................... H02J 7/025 320/103
8,193,764 B2 * 6/2012 Jakubowski .......... H02J 7/0054 320/108
8,258,745 B2 * 9/2012 Smith ...................... A61L 2/00 320/108
9,287,722 B2 * 3/2016 Williams ............. H02J 7/0013

(Continued)

FOREIGN PATENT DOCUMENTS

CN 201533182 * 7/2010
CN 201533182 U 7/2010
CN 203087938 U 7/2013

(Continued)

OTHER PUBLICATIONS

Search Report of counterpart Hong Kong Short-term Patent Application No. 15106122.1 issued on Sep. 18, 2015.

(Continued)

*Primary Examiner* — Richard V Muralidar

(57) ABSTRACT

Disclosed is a wireless charging device and a method facilitating wireless charging of one or more portable electronic devices. The wireless charging device may include a battery assembly comprising a receiving unit electrically coupled with the transmitting unit. A first set of charging coils within the receiving unit may wirelessly receive, via an electromagnetic induction, electrical energy from a second set of charging coils within an external power source. A third set of charging coils within the transmitting unit may wirelessly transmit, via an electromagnetic induction, the electrical energy received by the receiving unit to one or more (Continued)

10 20 42 100 40 90 60 92 94 96 98 99 72 74 76 78 82 84 80 110 70 86 32 30 50 52 portable electronic devices positioned within a predetermined transmission distance from the transmitting unit. A fourth set of charging coils within the one or more portable electronic devices may receive the electrical energy from the transmitting unit thereby facilitating charging of one or more batteries of the one or more portable electronic devices.

20 Claims, 11 Drawing Sheets

(56) References Cited

U.S. PATENT DOCUMENTS 9,325,195 B2 * 4/2016 Katz ........................ H02J 7/025

FOREIGN PATENT DOCUMENTS

| | | | | |
|---|---|---|---|---|
| CN | 204048422 | | * | 12/2014 |
| CN | 204048422 | U | | 12/2014 |
| CN | 104659868 | A | | 5/2015 |
| CN | 204317801 | U | | 5/2015 |
| JP | 2012019649 | | * | 1/2012 |
| JP | 2012019649 | A | | 1/2012 |

OTHER PUBLICATIONS

Search Report issued by the Chinese Patent Office on Nov. 5, 2015.

* cited by examiner

Tightly coupled coils: Coil Distance (z) smaller than Coil Diameter (D)

Loosely coupled coils: Coil Distance (z) similar to Coil Diameter (D)

WIRELESS CHARGING DEVICE AND METHOD THEREOF

CROSS-REFERENCE TO RELATED APPLICATIONS AND PRIORITY

The present application claims priority from U.S. Provisional Patent Application No. 62/437,647 dated Dec. 21, 2016, the entirety of which is incorporated herein by a reference.

TECHNICAL FIELD

The present subject matter described herein, in general, relates to a device and method for facilitating wireless charging of one or more portable electronic devices.

BACKGROUND

With the advent of communication technology, smart communication devices have been used in various commercial, business, personal, consumer, and other applications. While smartphones are being used for voice and data communication along with other auxiliary applications (e.g. playing games, watching videos, scheduling tasks and monitoring health), the other smart devices such as smart watches, smart jewelries and smart glasses are being used fruitfully for specific applications. Therefore, these smart communication devices have become an essential part of individual's daily routine. However, the smart communication devices are required to be supplied with an electrical power in order to facilitate continual use of these devices.

Typically, wired or USB-supply power connections are provided in order to supply power to the smart communication devices. However, since users may be travelling outstations for work and/or other activities, it is not feasible for the user to carry these wired or USB-supply power connections to charge the smart communication devices. Even if the wired or USB-supply power connections are available, these need to be connected to a mains power source which may not be readily available when the users are travelling. In order to overcome these challenges, portable chargers have been proposed in the art which enables the users to charge different types of portable electronic devices anytime at any location. Therefore, the portable chargers are of immense convenience to the users especially when the users are travelling and unable to locate the mains power source for supplying the power to the smart communication devices. However, the technical challenges of the portable chargers available are that these portable chargers are still provided with mechanical cable connections that enable connecting the portable chargers to the smart communication devices in order to charge the smart communication devices. Additionally, after charging, once the power stored in the battery of the portable charger is consumed, the battery is generally recharged by connecting the portable charger to the mains power source which may not be conveniently available at the time when recharging is required.

SUMMARY

This summary is provided to introduce concepts related to devices and methods for facilitating wireless charging of one or more portable electronic devices and the concepts are further described below in the detailed description. This summary is not intended to identify essential features of the claimed subject matter nor is it intended for use in determining or limiting the scope of the claimed subject matter.

In one embodiment, a wireless charging device is disclosed. The wireless charging device may include a battery assembly comprising a receiving unit and a transmitting unit. The receiving unit may be electrically coupled with the transmitting unit. The receiving unit may be configured to wirelessly receive, via an electromagnetic induction, electrical energy from an external power source. In one aspect, the electrical energy may be received by a first set of charging coils within the receiving unit from a second set of charging coils within the external power source. The transmitting unit may be configured to wirelessly transmit, via an electromagnetic induction, the electrical energy received by the receiving unit to one or more portable electronic devices positioned within a predetermined transmission distance from the transmitting unit. In one aspect, the transmitting unit may transmit the electrical energy, via a third set of charging coils within the transmitting unit, to a fourth set of charging coils within the one or more portable electronic devices thereby facilitating charging of one or more batteries of the one or more portable electronic devices.

In another embodiment, a method for facilitating wireless charging of one or more portable electronic devices is disclosed. The method may include providing a wireless charging device further comprising a receiving unit and a transmitting unit. The receiving unit may be electrically coupled with the transmitting unit. The method may further include wirelessly receiving, by the receiving unit, electrical energy from an external power source via an electromagnetic induction. In one aspect, the electrical energy may be received by a first set of charging coils within the receiving unit from a second set of charging coils within the external power source. Further, the method may include wirelessly transmitting, by the transmitting unit, the electrical energy received by the receiving unit to one or more portable electronic devices, via electromagnetic induction, positioned within a predetermined transmission distance from the transmitting unit. In one aspect, the electrical energy may be transmitted via a third set of charging coils, within the transmitting unit, to a fourth set of charging coils within the one or more portable electronic devices thereby facilitating charging of one or more batteries of the one or more portable electronic devices.

BRIEF DESCRIPTION OF THE DRAWINGS

The detailed description is described with reference to the accompanying figures.

a smartphone) and 100*b* (e.g. a smart watch) placed upon the wireless charging device 10, in accordance with an embodiment of the present application.

Figure 6:
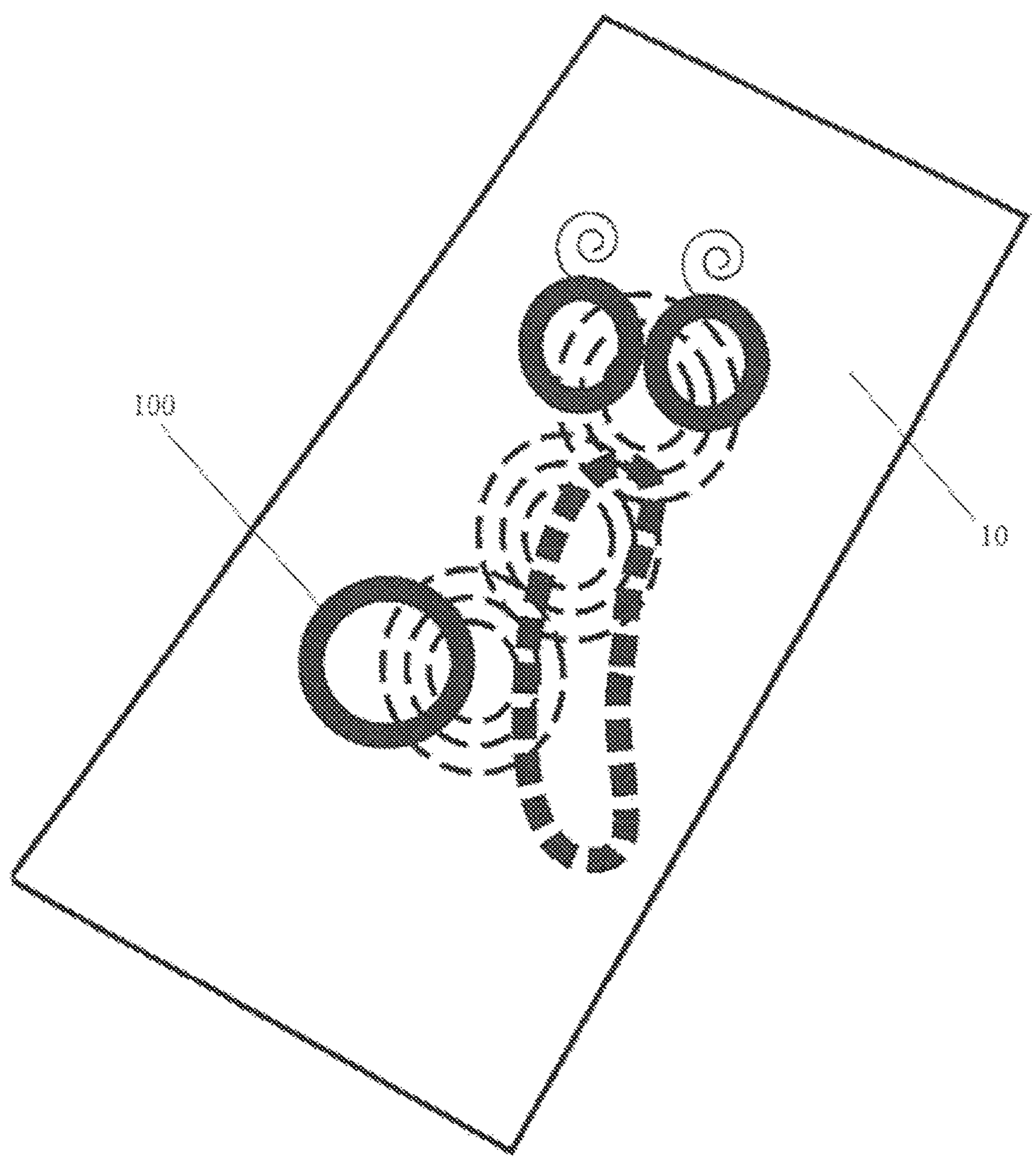

FIG. 6 illustrates the wireless charging device 10 configured for charging one or more electronic jewelries placed upon the wireless charging device 10, in accordance with an embodiment of the present application.

Figure 7:
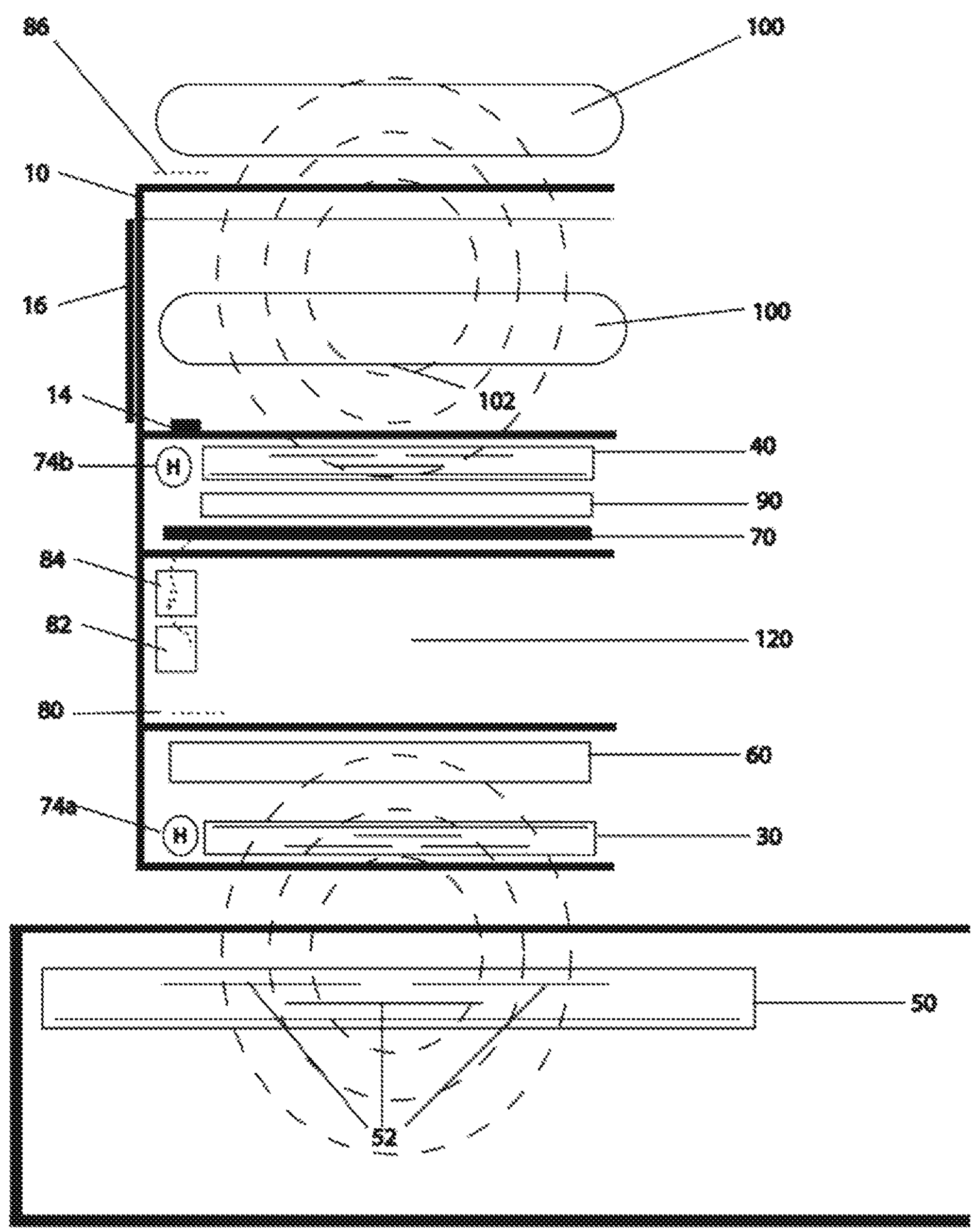

FIG. 7 illustrates a sectional view of the wireless charging device 10 charged wirelessly at a docking charging station 50, in accordance with an embodiment of the present application.

Figure 8A:
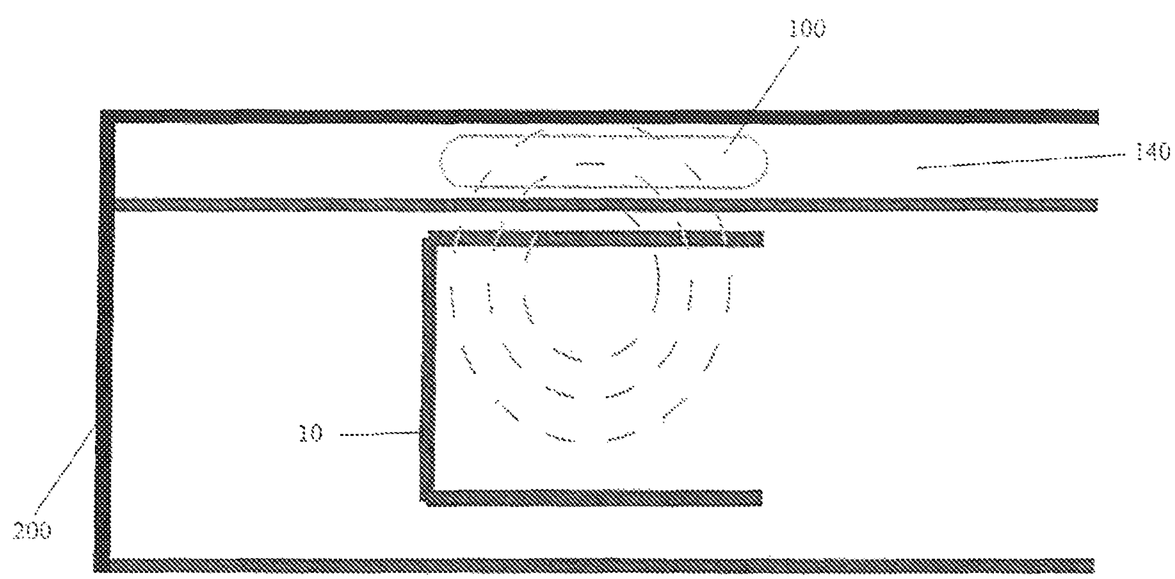
Figure 8B:
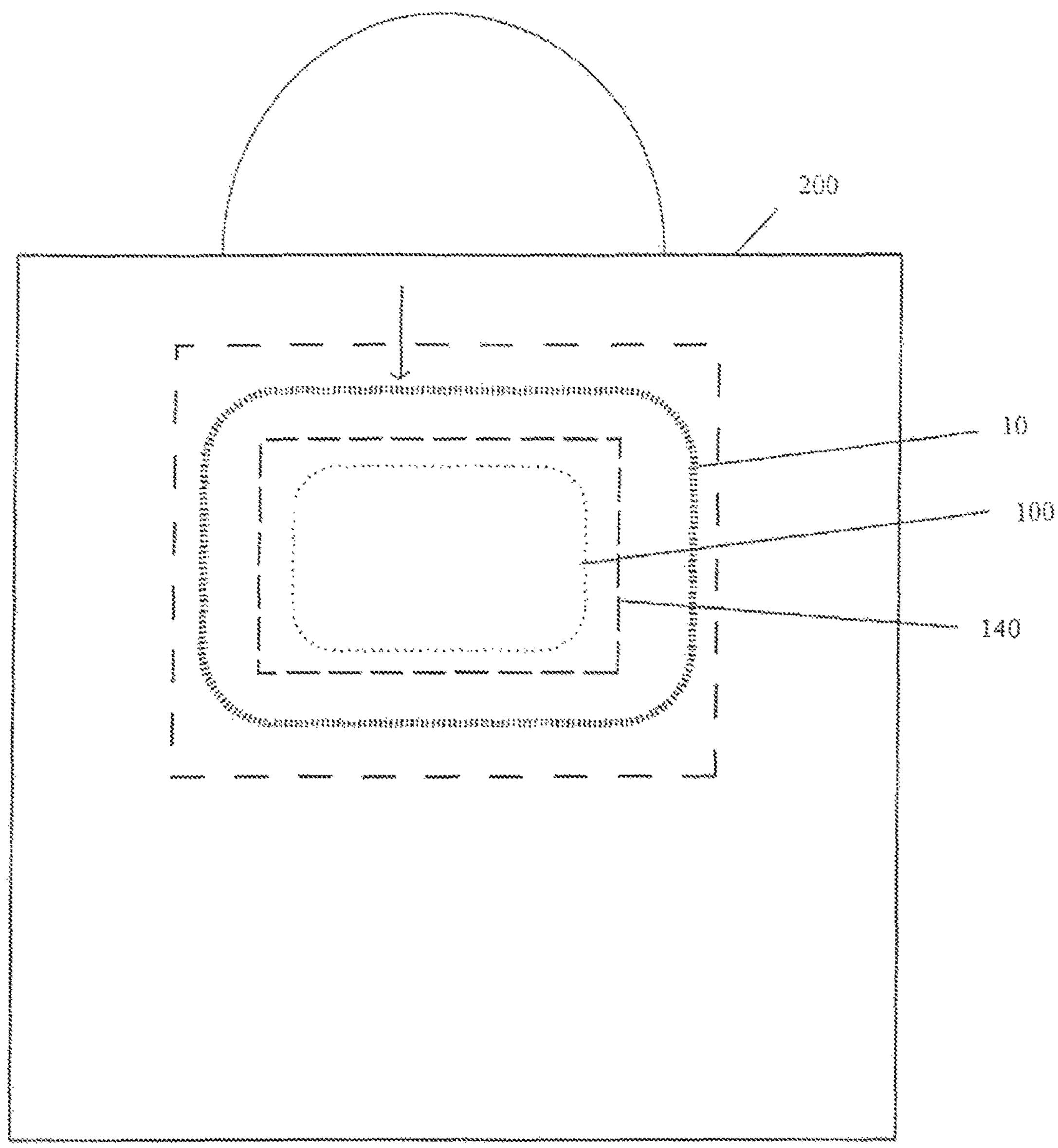

FIG. 8(*a*) illustrates a sectional view of the wireless charging device 10 being placed within a handbag 200 of a user, in accordance with an embodiment of the present application.

FIG. 8(*b*) illustrates a front view of the wireless charging device 10 being placed within the handbag 200, in accordance with an embodiment of the present application.

Figure 9:
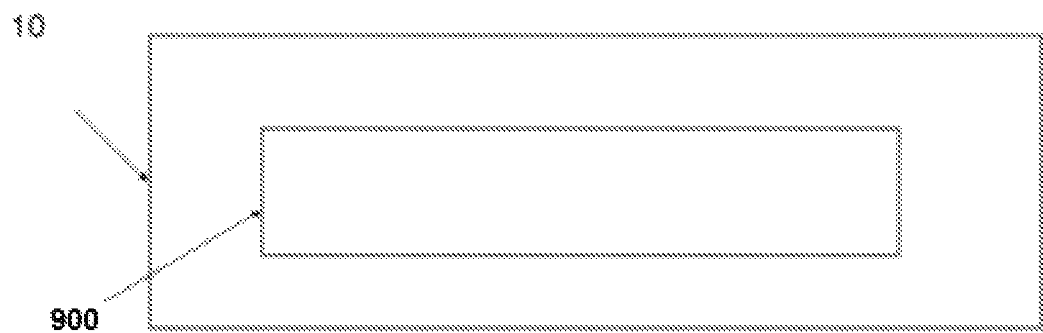

FIG. 9 illustrates the wireless charging device 10 having an internal pocket 900, in accordance with an embodiment of the present application.

Figure 10A:
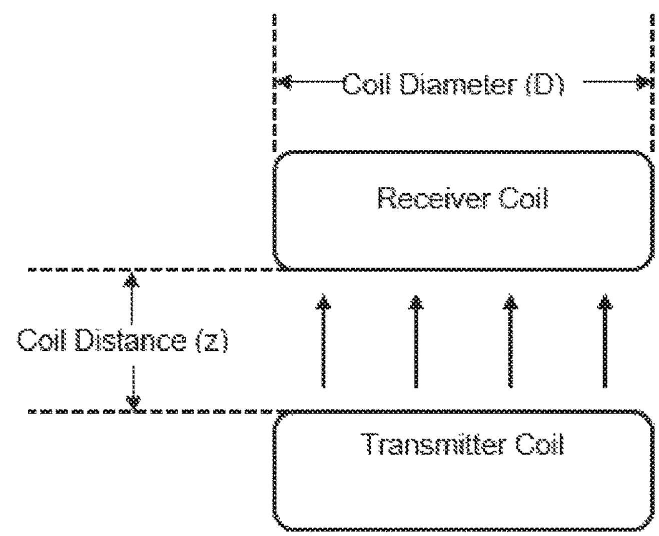
Figure 10B:
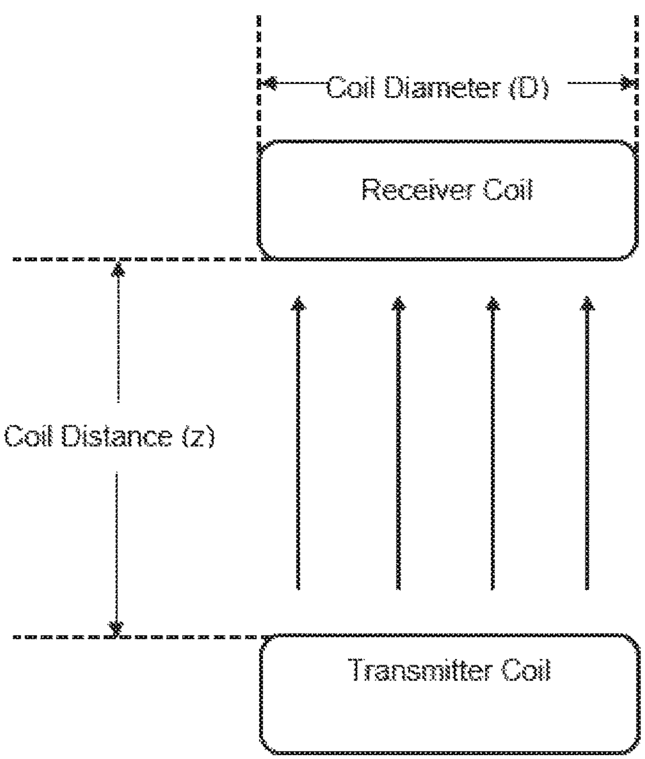

FIGS. 10(*a*) and 10(*b*) illustrate wireless charging implemented in inductive mode and resonant mode respectively, in accordance with embodiments of the present application.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any apparatuses, devices and methods similar or equivalent to those described herein can be used in the practice or testing of embodiments of the present disclosure, the exemplary, apparatuses, devices and methods are now described. The disclosed embodiments are merely exemplary of the disclosure, which may be embodied in various forms.

Various modifications to the embodiments will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Wireless charging device and method for facilitating wireless charging of one or more portable electronic devices are described. In accordance with the aspects of the present application, the wireless charging device may be a charging pouch in form of purse, or a wallet or a clutch. The one or more portable electronic devices may include smartphones, portable computing devices, tablet computers, wearables, and the like. The examples of wearables include, but not limited to, smart watches, smart jewelries, and the like. The wireless charging device may charge the one or more portable electronic devices as-soon-as the one or more portable electronic devices are placed either within the wireless charging device or on top of the wireless charging device or outside the wireless charging device adjacent to one of the sides of wireless charging device. It is to be noted that the physical configuration of the wireless charging device is such that the one or more portable electronic devices may be comfortably accommodated within the wireless charging device or placed on top of the wireless charging device.

The wireless charging device may include a battery assembly comprising a receiving unit and a transmitting unit for facilitating the wireless charging of the one or more portable electronic devices. The receiving unit may be electrically coupled with the transmitting unit in the battery assembly. Once the wireless charging device is placed upon an external power source, a first set of charging coils within the receiving unit may receive an electrical energy from a second set of charging coils within the external power source via an electronic induction mechanism. The external power source may be a docking charging station of a type including an inductive power transmitter or a magnetic resonance transmitter. Further, the external power source may be powered via one of an AC power source or a USB power connection. The electrical energy received by the receiving unit may be stored in a battery of the battery assembly thereby charging the battery.

The electrical energy stored in the battery may be transmitted by the transmitting unit to the one or more portable electronic devices positioned within a predetermined transmission distance from the transmitting unit. In one aspect, the predetermined transmission distance may be based upon specification requirements of at least one of the transmitting unit and the one or more portable electronic devices. It is to be noted that the overall thickness of the wireless charging device is such that when at least one portable electronic devices is arranged outside the pouch adjacent to a side of the wireless charging device, the at least one portable electronic device is within the effective transmission distance from the transmitting unit. Further, the wireless charging device may comprise at least one partition adapted to snugly receive the one or more portable electronic devices such that a wireless transmission active surface of the one or more portable electronic device are positioned within the predetermined transmission distance from the energy transmitting unit. The transmitting unit may transmit the electrical energy, via a third set of charging coils within the transmitting unit, to a fourth set of charging coils within the one or more portable electronic devices thereby facilitating charging of one or more batteries of the one or more portable electronic devices.

It must be understood and appreciated that a user may be enabled to place a portable electronic device into the wireless charging device (having the structure of a pouch) in order to initiate the wireless charging of the portable electronic device without requiring the user to position or align the portable electronic device to a charger. While aspects of described device and method for facilitating wireless charging of the one or more portable electronic devices may be implemented in any number of different systems, apparatuses, environments, and/or configurations, the embodiments are described in the context of the following exemplary system.

Figure 1:
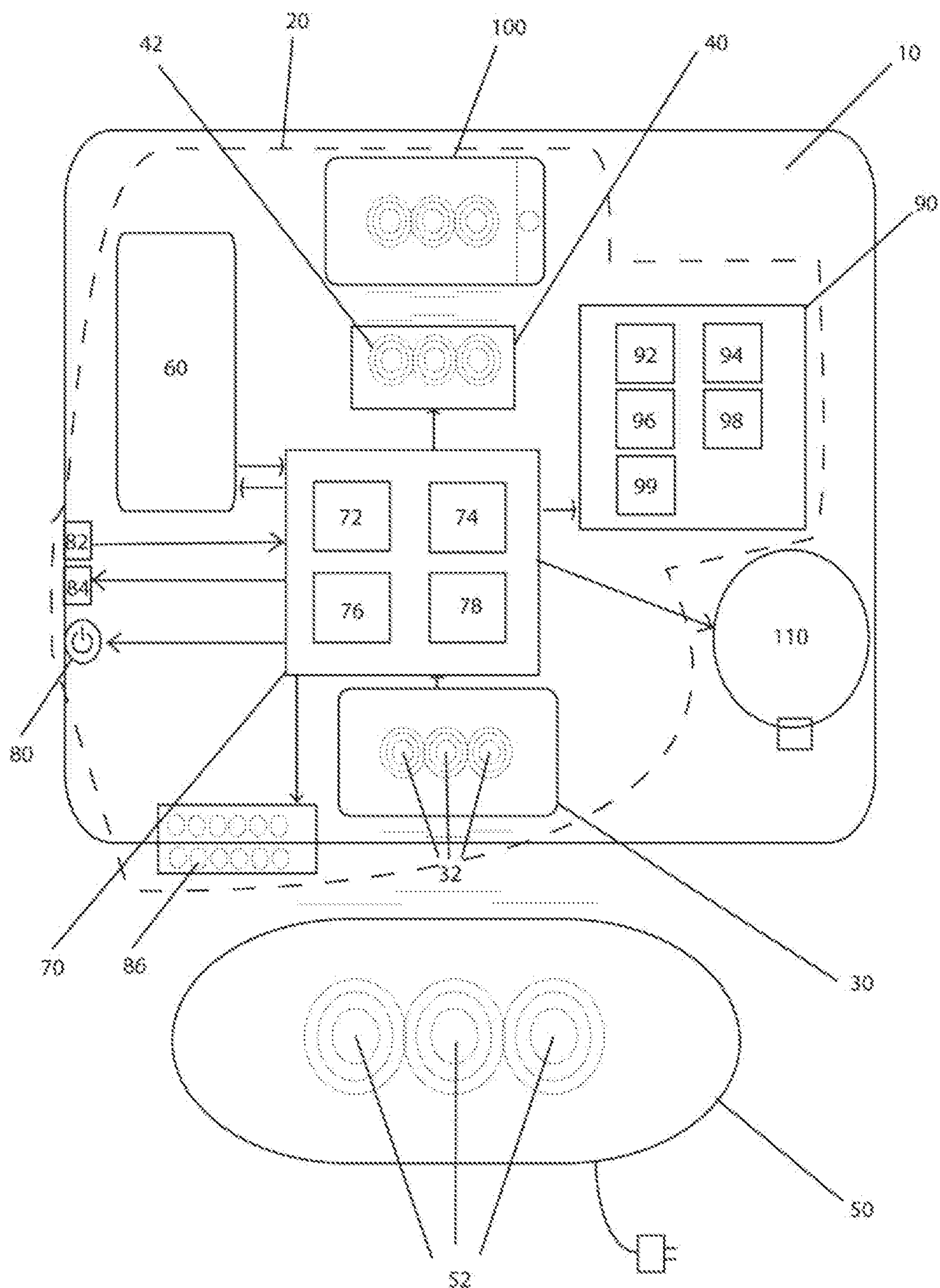
FIG. 1 illustrates a block diagram showing components of a wireless charging device 10 for charging a portable electronic device 100, in accordance with an embodiment of the present application.

Referring to FIG. 1 is a block diagram showing components of a wireless charging device 10 facilitating charging of a portable electronic device 100, in accordance with an embodiment of the present application. In one embodiment, the wireless charging device 10 may be in form of a charging pouch having the shape as that of a pouch. Hereinafter, the wireless charging device 10 may be interchangeably referred to as wireless charging pouch 10 or pouch 10 interchangeably. In one example, the charging pouch may be a purse or a wallet or a clutch. As shown in FIG. 1, the wireless charging device 10 may comprise a battery assembly 20 incorporating the multiple components. The battery assembly 20 may comprise a receiving unit 30 electrically connected with a transmitting unit 40 as shown. The receiving unit 30 may wirelessly receive electrical energy, via an electromagnetic induction, from an external power source such as wireless docking charging station 50 as shown. In one embodiment, the electrical energy may be received by a first set of charging coils 32 (hereinafter referred as "receiver coils 32") within the receiving unit 30 from a second set of charging coils 52 (hereinafter referred as "power source coils 52") within the wireless docking charging station 50.

In an embodiment, the docking charging station 50 may be of any type including an inductive station or magnetic resonance power transmission station available in the market. The docking charging station 50 may be powered by an AC power source and/or via a USB power connection. The receiving unit 30 may be configured to wirelessly receive, via an electromagnetic induction, an electrical energy from the power source coils 52 coupled with the receiver coils 32 within the receiving unit 30. In an embodiment, the receiving unit 30 may comprise three or more receiver coils 32 as shown in FIG. 1 in order to enable effective inductive coupling between the receiving unit 30 and the docking charging station 50. The receiving unit 30 may be at an effective transmission distance from the docking charging station 50 in order to enable effective and/or efficient coupling between the receiving unit 30 and the docking charging station 50. The effective transmission distance between the receiving unit 30 and the docking charging station 50 may be less than or equal to 5 cm. In various embodiments, the effective transmission distance between the receiving unit 30 and the docking charging station 50 may be within a predefined range of 5 mm to 5 cm. In one exemplary embodiment, the effective transmission distance between the receiving unit 30 and the docking charging station 50 may be 1 cm.

As shown in FIG. 1, the battery assembly 20 may further comprise an energy storage means 60 adapted to store the electrical energy received by the receiving unit 30. In one embodiment, the energy storage means 60 may act as a rechargeable battery (hereinafter referred as rechargeable battery 60) of the wireless charging device 10 capable of being recharged via the electrical energy being received from the receiving unit 30. In one embodiment, the rechargeable battery 60 may be a lithium rechargeable battery available in the market. In another embodiment, the rechargeable battery 60 may be a graphene rechargeable battery. As would be appreciated by those of ordinary skill in the art, having the benefit of the present application, the present application is not limited to utilize the lithium rechargeable battery or the graphene rechargeable battery as the rechargeable battery 60 and any other batteries available in the art may be used in the present application without deviating from the scope of the present application. Further, as shown in FIG. 1, the battery assembly 20 may comprise a transmitting unit 40 electrically connected with the receiving unit 30 and the rechargeable battery 60. The transmitting unit 40 may be adapted to wirelessly transmit, via an electromagnetic induction, the energy stored in the rechargeable battery 60 to a portable electronic device 100 positioned within an effective transmission distance from the transmitting unit 40. Though, a single portable electronic device 100 is shown in FIG. 1, however, the present wireless charging device 10 is capable of wirelessly charging more than one portable electronic devices simultaneously. In various embodiments, the portable electronic devices may include one or more of smartphones, portable computing devices, tablet computers, wearables, and the like.

In one embodiment, the transmitting unit 40 may transmit the electrical energy via a third set of charging coils 42 (hereinafter referred as "transmitter coils 42") within the transmitting unit to a fourth set of charging coils within the portable electronic device 100 thereby facilitating charging of one or more batteries of the portable electronic device 100. In an embodiment, the transmitting unit 40 may comprise three or more transmitter coils 42 as shown in FIG. 1 in order to enable effective inductive coupling between the transmitting unit 40 and the portable electronic device 100.

In an embodiment, the transmitting unit 40 may transmit the electrical energy to the portable electronic device 100 when the portable electronic device 100 is either placed within the wireless charging device 10 (as shown in FIG. 1) or on top of the wireless charging device 10 or exterior to the wireless charging device 10 adjacent to one of the sides of the wireless charging device 10. In one example, the portable electronic device 100 may be positioned outside the wireless charging device 10 either at a first side (e.g. left side) of the wireless charging device 10 or at a second side (e.g. a right side) of the wireless charging device 10 for enabling the wireless charging device 10 to wirelessly charge the portable electronic device 100. In another example, two portable electronic devices may be positioned each at one of the two sides of the wireless charging device 10 for enabling the wireless charging device 10 to simultaneously charge both the portable electronic devices.

It is to be noted that, irrespective of the placement of the portable electronic device 100 within the wireless charging device 10 or outside the wireless charging device 10 or on top of the wireless charging device 10, the portable electronic device 100 must be within the effective transmission distance from the transmitting unit 40 for enabling effective and/or effective coupling between the transmitting unit 40 and the portable electronic device 100. The effective transmission distance between the transmitting unit 40 and the portable electronic device 100 may depend upon the specifications/requirements of the transmitting unit 40 and/or the portable electronic device 100. In an embodiment, the effective transmission distance between the transmitting unit 40 and the portable electronic device 100 may be less than or equal to 5 cm. In various embodiments, the effective transmission distance between the transmitting unit 40 and the portable electronic device 100 may be within a predefined range of 5 mm to 5 cm. In one exemplary embodiment, the effective transmission distance between the transmitting unit 40 and the portable electronic device 100 may be 1 cm.

In an embodiment, the transmitting unit 40, the receiving unit 30 and the rechargeable battery 60 may be wrapped collectively within a heat resistant packaging unit capable of preventing and/or reducing transfer of heat generated within the wireless charging device 10. In an embodiment, the transmitting unit 40 and the receiving unit 30 may be provided with one or more reflective plates for controlling the direction of electrical energy being transmitted. In one embodiment, the rechargeable battery 60 may be integrally arranged within the wireless charging device 10 and therefore may not removable from the wireless charging device 10. In one embodiment, the rechargeable battery 60 may be enclosed between two linings of a portion of the wireless charging pouch 10 so that the rechargeable battery 60 is unexposed to the user when the wireless charging pouch 10 is in use. In an alternative embodiment, the rechargeable battery 60 may also be releasably connected at the battery assembly 20 so that different batteries may be interchanged for replacement or upgrade.

In an embodiment, the battery assembly 20, as shown in FIG. 1, may further comprise a control unit 70 configured to control overall operation of the battery assembly 20. In one embodiment, the control unit 70 may be a printed circuit board assembly (PCBA) housing multiple electronic components. In one embodiment, the control unit 70 may be configured to control wireless receiving of the electrical energy by the receiving unit 30 from the wireless docking charging station 50 thereby effectively recharging the rechargeable battery 60 of the battery assembly 20. In another embodiment, the control unit 70 may be configured to control wireless transmission of the electrical energy by the transmitting unit 40 to the portable electronic device 100 thereby facilitating charging and/powering the portable electronic device 100. In yet another embodiment, the control unit 70 may be configured to control the receiving and transmitting of the electrical energy simultaneously in order to facilitate simultaneous recharging of the rechargeable battery 60 and the charging/powering of the portable electronic device 100. In an embodiment, the control unit 70 may act as a chipset adapted to control input and output power to ensure efficiency of the energy transfer for single and multiple charging coils. In one example, the control unit 70 may be configured to control the allocation of power such that the power is received only by the charging coils adapted to charging the batteries of the portable electronic device 100 and thereby avoiding wastage of energy on the other inactive charging coils.

As described above, the control unit 70 may include multiple electronic components. In an embodiment, the electronic components may include a battery level sensor 72, a temperature sensor 74, an object detection sensor 76, a wireless communication module 78 and one or more signalling means 86. The battery level sensor 72 may be adapted to automatically switch ON/OFF the battery assembly 20. The temperature sensor 74 may be adapted to monitor the temperature within the battery assembly 20 thereby preventing overheating of the battery assembly 20. Specifically, the temperature sensor 74 may be enabled to prevent the overheating of the battery assembly 20 during charging or discharging. The object detection sensor 76 may be adapted to detect foreign objects within the wireless charging device 10 and thereby prevent transmission of the electrical energy to these foreign objects detected. In one example, a foreign object detected may be a credit/debit card placed adjacent to the wireless charging pouch 10 (e.g. a purse or a wallet) or within the wireless charging pouch 10. Based upon the detection of the credit/debit card, the object detection sensor 76 may signal the control circuit 70 to prevent the transmission of the electrical energy by the transmitting unit 40 to the credit/debit card detected. The one or more signalling means 86 may be adapted to signal various operation statuses of the battery level sensor 72, the temperature sensor 74 and the object detection sensor 76. In one embodiment, each of the one or more signalling means 86 may signal the various operation statuses in form of an audio signal or a visual signal or both. In one exemplary embodiment, the one or more signalling means 86 may be in form of Light Emitting devices such as LED lights or digital displays. In an embodiment, the wireless communication module 78 may be adapted to wirelessly communicate with one or more portable electronic devices 100, other electronic devices, systems and/or computer networks. The wireless communication module 78 may communicate via wireless communication technologies including, but not limited to, WiFi™ Bluetooth™, Near Field Communication (NFC), Global Positioning System (GPS), Qi™ PMA™, RFID technology, and the like.

In an embodiment, the battery assembly 20, as shown in FIG. 1, may further comprise a main switch 80 configured for switching ON/OFF the battery assembly 20, wherein the switching ON/OFF the battery assembly 20 may also be controlled by the control unit 70. Further, as shown in FIG. 1, the battery assembly 20 may comprise one or more input interfaces 82 and one or more output interfaces 84. The one or more input interfaces 82 and the one or more output interfaces 84 may be provided in form of USB connectors. Each input interface 82 may be adapted to electrically connect the wireless charging device 10 with one or more input sources including power sources or other data/information sources. Further, each output interface 84 may be adapted to electrically connect the wireless charging device 10 with the one or more portable electronic devices 100, other electronic devices, systems, computer networks, and the like.

In an embodiment, the battery assembly 20, as shown in FIG. 1, may further comprise an auxiliary control unit 90 including multiple electronic components to perform auxiliary functions. The multiple components within the auxiliary control unit 90 may include a memory unit 92, data synchronizing module 94, a GPS module 96, a temperature control unit 98 and an emergency unit 99. The memory unit 92 may be configured to store data. The synchronizing module 94 may be configured to synchronize the data between the portable electronic device 100 and the data stored in the memory unit 92 thereby facilitating the data backup. In one embodiment, the data stored in the portable electronic device 100 may include user's personal data and App data/App functions associated to various applications hosted on the portable electronic device 100. The user's personal data and App data/App functions may be required to be preserved and tracked for future usage. Therefore, the user's personal data and the App data/App functions may be stored within the memory unit 92 of the wireless charging device 10 based upon the synchronization of the data between the portable electronic device 100 and the memory unit 92 thereby creating a backup of the user's personal data and the App data/App functions. In an embodiment, the synchronization of the data further enables in tracking/updating a battery status, a battery temperature and portable electronic device temperature via a mobile application hosted on the portable electronic device 100 in order to provide insights on battery consumption and battery temperature safety to the user. The GPS module 96 may be configured for positioning and/or locating of an electronic item. In one exemplary embodiment, the electronic item may be a mobile phone, or a wireless headset, or a wireless jewellery or a wireless home/car keys, and the like. The temperature control unit 98 may be configured to control heating or cooling of the battery assembly 20 and thereby the wireless charging device 10. The emergency unit 99 may be configured to trigger and transmit an emergency alert to one or more authorized personals in case of emergency situations. In one example, the emergency unit 99 may trigger and transmit an emergency alert in event of detection of pressing of the main switch 80 for an extended period of time (e.g. more than 5 seconds) continuously.

The term "integrated" or "integrally" in the context of this application has a meaning that the battery assembly, either in part or in whole, is combined, merged or unified with the pouch to form part of the overall structure of the pouch such as that integrated part is not removable by the user. For example, the integrated part is being stitched at a portable of the pouch. Whilst it is illustrated in FIG. 1 that the battery assembly 20 comprises several separated electronic components, it is understandable that the battery assembly 20 may be configured in the form of one single unit which is integrated at the pouch 10.

As shown in FIG. 1, the wireless charging pouch 10 may further comprise one or more lighting units 110 arranged within the wireless charging pouch 10 and/or outside the wireless charging pouch 10. The one or more lighting units 110 may include, but not limited to, optical fibre lights or LED lights. The one or more lighting units 110 may be provided for illuminating and/or decorating the wireless charging pouch 10.

Figure 2:
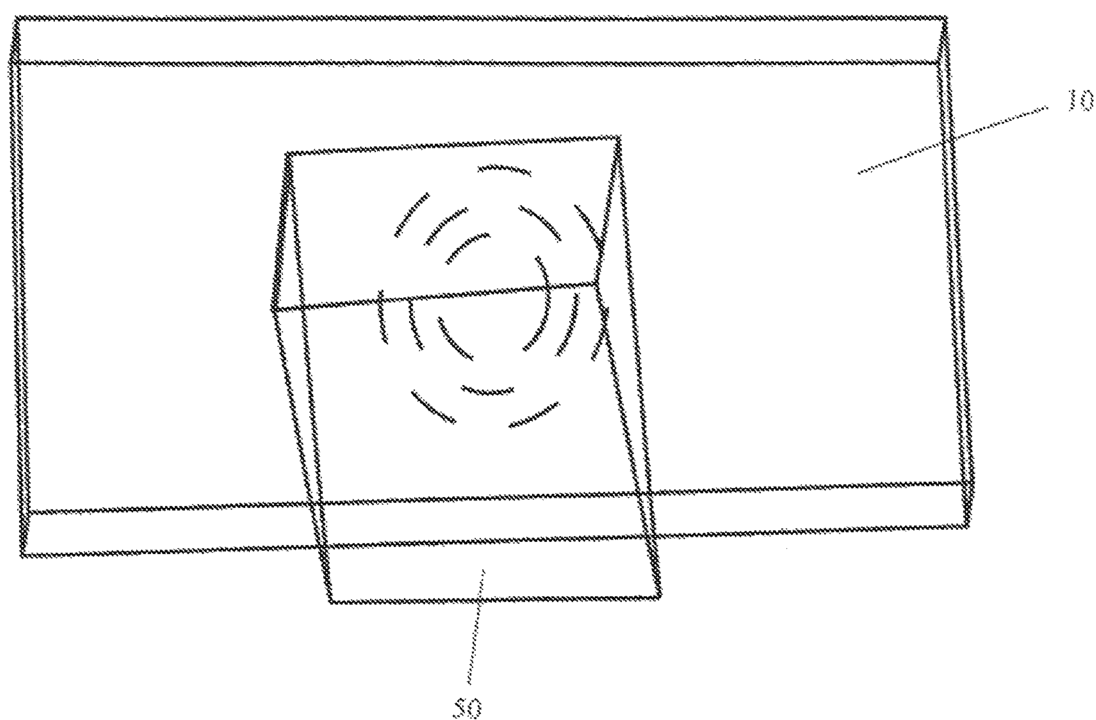
FIG. 2 illustrates the wireless charging device 10 being charged wirelessly at a docking charging station 50, in accordance with an embodiment of the present application.
Figure 3:
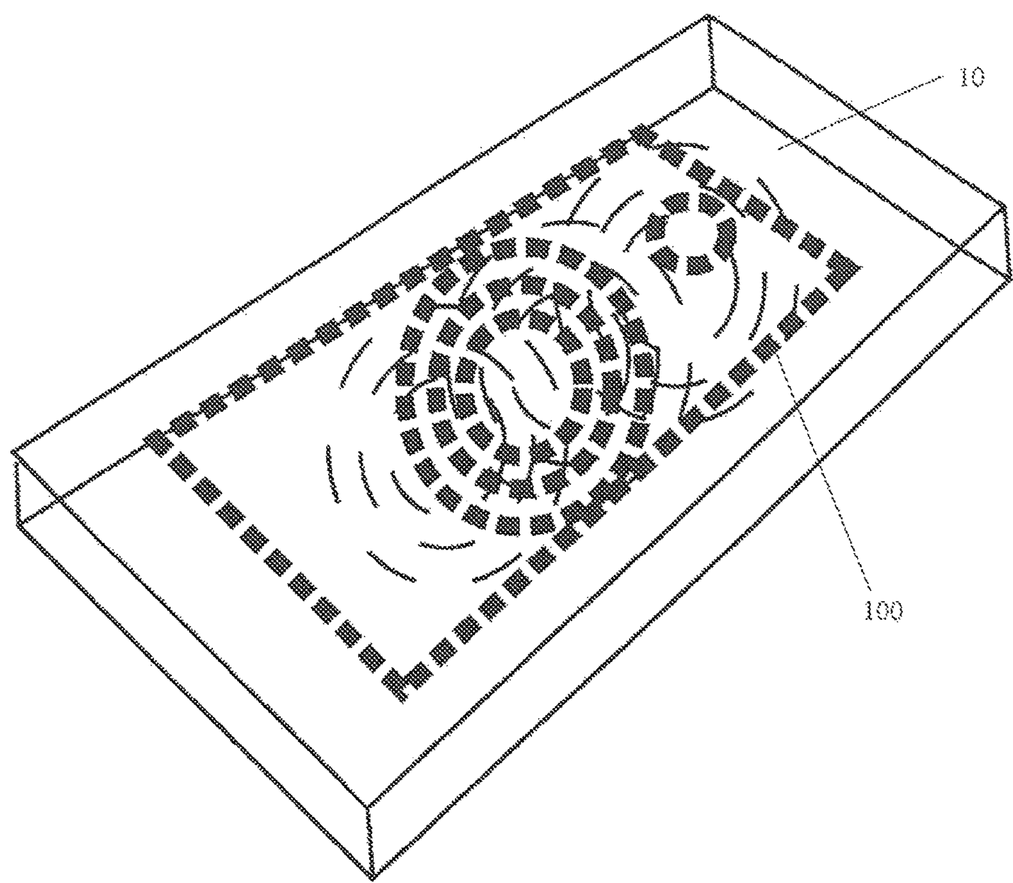
FIG. 3 illustrates the wireless charging device 10 configured for charging the portable electronic device 100 (e.g. a smartphone) accommodated within the wireless charging device 10, in accordance with an embodiment of the present application.
Figure 4:
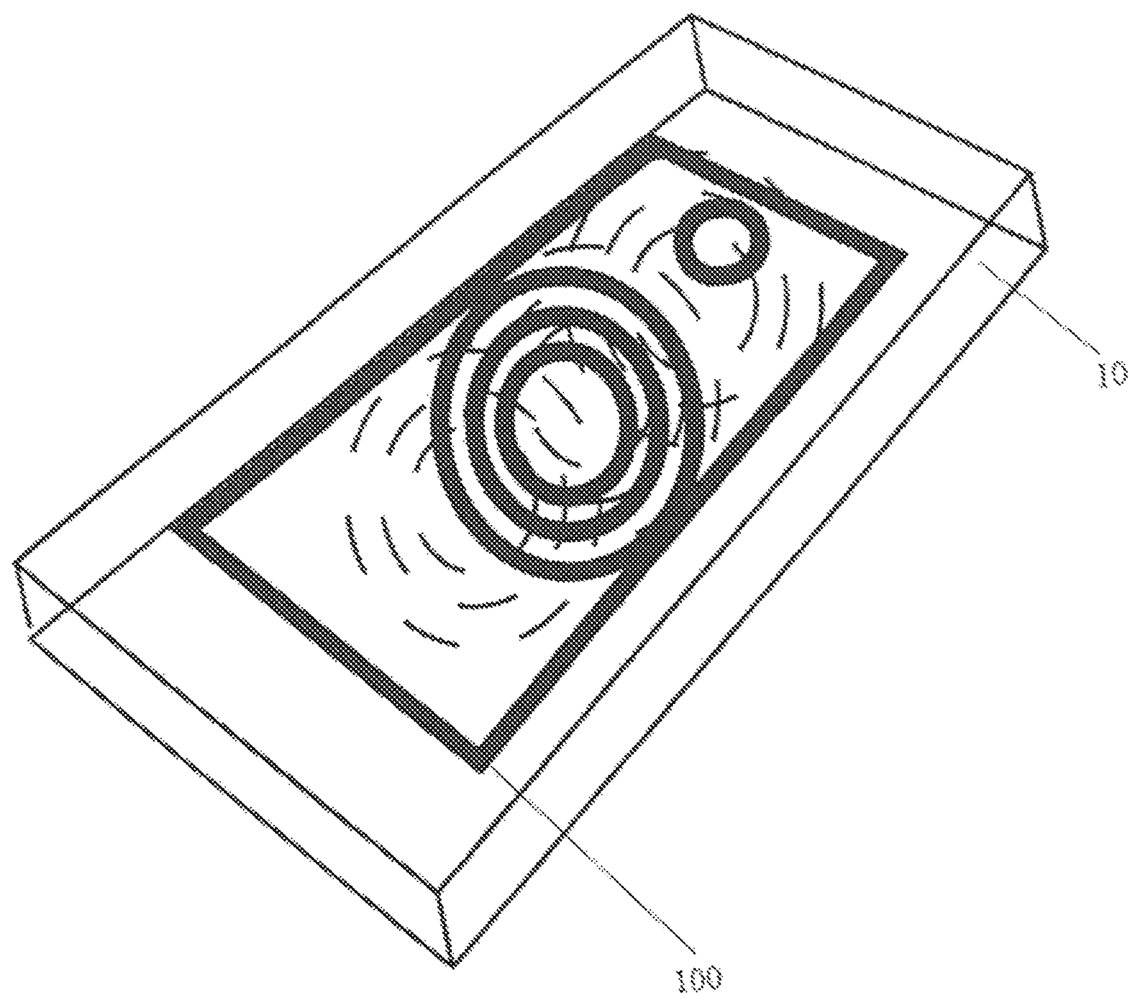
FIG. 4 illustrates the wireless charging device 10 configured for charging the portable electronic device 100 (e.g. a smartphone) placed upon the wireless charging device 10, in accordance with an embodiment of the present application.
Figure 5:
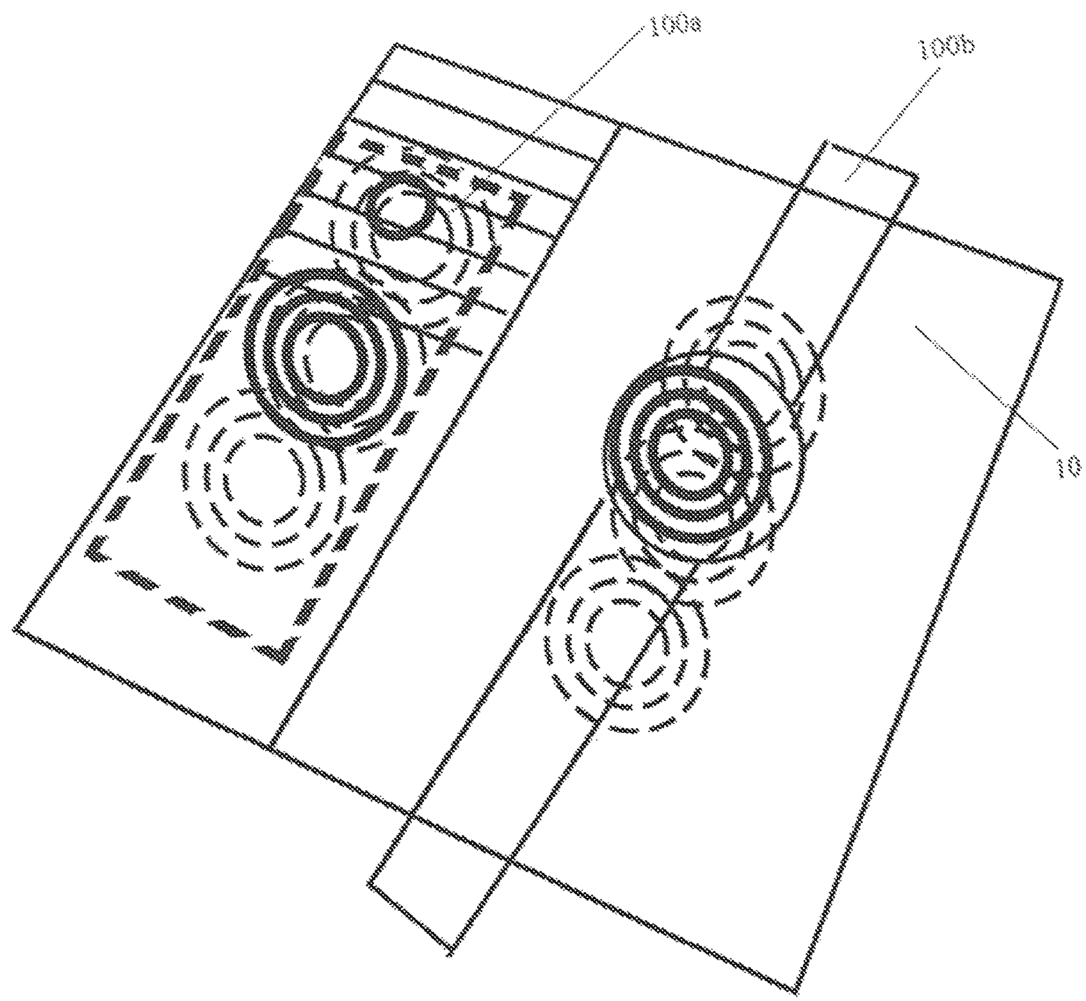
FIG. 5 illustrates the wireless charging device 10 configured for charging two portable electronic devices 100*a* (e.g.

Now referring to FIG. 2 to FIG. 6 are various embodiments depicting different charging/recharging scenarios amongst the wireless charging pouch 10, the docking charging station 50 and the one or more portable electronic devices 100 via an electromagnetic induction. For example, FIG. 2 illustrates the wireless charging device 10 being charged wirelessly at a docking charging station 50, in accordance with one embodiment of the present application. FIG. 3 illustrates the wireless charging device 10 being configured to charge the portable electronic device 100 (e.g. a smartphone) accommodated within the wireless charging device 10, in accordance with another embodiment of the present application. Further, FIG. 4 illustrates the wireless charging device 10 being configured to charge the portable electronic device 100 (e.g. a smartphone) placed upon the wireless charging device 10, in accordance with yet another embodiment of the present application. FIG. 5 illustrates the wireless charging device 10 being configured to charge two portable electronic devices 100*a* (e.g. a smartphone) and 100*b* (e.g. a smart watch) placed upon the wireless charging device 10, in accordance with yet another embodiment of the present application. FIG. 6 illustrates the wireless charging device 10 being configured to charge one or more electronic jewelries placed upon the wireless charging device 10, in accordance with still another embodiment of the present application.

Now referring to FIG. 7, a sectional view of the wireless charging pouch 10 being charged wirelessly at a docking charging station 50 is illustrated. As shown in FIG. 7, the wireless charging pouch 10 may comprise at least one partition adapted to snugly receive the one or more portable electronic devices 100 in a manner such that the one or more portable devices 100 are properly positioned and/or orientated within the effective transmission distance from the transmitting unit 40. In one embodiment, the wireless charging pouch 10 may be adapted to accommodate a portable electronic device 100 within the wireless charging pouch 10 at a position such that an inductive transmission active surface 102 of the portable electronic device 10 is arranged to be in close proximity with the transmitting unit 40 of the battery assembly 20 of the wireless charging pouch 10.

In an embodiment, the wireless charging pouch 10 may comprise an indicating means 14 configured to indicate a defined orientation of the portable electronic device 100 such that the portable electronic device 100 is appropriately positioned and/or orientated relative to the transmitting unit 40 for facilitating effective wireless transmission. In one embodiment, the indicating means 14 may be arranged at a wall of one of the partitions of the wireless charging pouch 10. In one embodiment, the the indicating means 14 may be in form a red mark stitched at the wall of one of the partitions, on which an inductive transmission active surface 102 of the portable electronic device 100 would be arranged to lie upon or face against so as enable an effective energy induction. In an alternative embodiment, the indicating means 14 may be in form a LED light (not shown) indicting a preferred orientation for the portable electronic device 100 relative to the transmitting unit 40 for effective and/or efficient inductive coupling between the transmitting unit 40 and the portable electronic device 100.

In an embodiment, as shown in FIG. 7, the wireless charging pouch 10 may further comprise a compartment 120 between the receiving unit 30 and the transmitting unit 40. The compartment 120 may act as a buffer capable of accommodating items that facilitates in avoiding interference between the receiving unit 30 and the transmitting unit 40. As shown in FIG. 7, two temperature sensors 74*a* and 74*b* are shown capable of monitoring the temperature within the the wireless charging pouch 10 in order to prevent the overheating of the the wireless charging pouch 10.

In an embodiment, as shown in FIG. 7, the wireless charging pouch 10 may comprise one or more indicating lights 16 positioned at the surface of the wireless charging pouch 10 or inside the wireless charging pouch 10 or at a zipper, a clip or a clasp of the wireless charging pouch 10. The one or more indicating lights 16 may be LED lights and are controlled by the control unit 70 to indicate various operating statuses of the battery assembly 20. In one exemplary embodiment, the one or more indicating lights 16 may be illuminated in green color when the rechargeable battery 60 is charged to its maximum capacity. In another exemplary embodiment, the one or more indicating lights 16 may be illuminated in red color when the rechargeable battery 60 is consumed and therefore required to be recharged. In yet another exemplary embodiment, the one or more indicating lights 16 may be illuminated in flashing green when the portable electronic device 100 is being charged by the rechargeable battery 60. In yet another exemplary embodiment, the one or more indicating lights 16 may be illuminated in flashing red when the wireless charging pouch 10 is being charged by the docking charging station 50. In still another exemplary embodiment, the one or more indicating lights 16 may be enabled to illuminate and/or decorate the wireless charging pouch 10 especially when the indicating lights 16 are positioned within the wireless charging pouch 10. It must be noted to one skilled in the art that the illumination of the one or more indicating lights 16 in either red/green color is for illustrative purpose and hence should not be construed to limit the scope of the present application. In another embodiment, the one or more indicating lights 16 may be adjusted to illuminate in white lights. In an embodiment, the indicating lights 16 may be controlled to flash at a rate equivalent to heart beat rate.

Now referring to FIG. 8(*a*) is a sectional view of the wireless charging pouch 10 being placed within a handbag 200 of a user, in accordance with an embodiment of the present application. FIG. 8(*b*) illustrates a front view of the wireless charging pouch 10 being placed within the handbag 200. As shown in FIG. 8(*a*) and FIG. 8(*b*), the wireless charging pouch 10 may be positioned adjacent to a pocket 140 of the handbag 200 in which the portable electronic device 100 is accommodated. In this embodiment, the portable electronic device 100 may be wirelessly charged, via an electromagnetic induction, by the battery assembly 20 of the wireless charging pouch 10, provided the portable electronic device 100 is within an effective transmission distance (e.g. less than or equal to 5 cm) from the transmitting unit 40 within the assembly 20 of the wireless charging pouch 10.

Now referring to FIG. 9 is the wireless charging pouch 10 (in form of a wallet) having an internal pocket 900, in accordance with an embodiment of the present application. In one embodiment, the internal pocket 900 of the wireless charging pouch 10 may be made of materials including, but not limited to, an aluminium sheet having characteristics of exhibiting RFID blocking and protection, radiation blocking, and signal blocking. The characteristics of RFID blocking and protection as-well-as the signal blocking prevents the intruders/unauthorized persons to steal the wireless charging pouch 10 or install data or viruses onto active or passive devices and active or passive cards within the wireless charging pouch 10 (i.e. the wallet). Examples of the active devices may include, but not limited to, mobile phones, keys, access passes, tablets, portable computing devices, and the like. The radiation blocking may ensure any radiation from the devices inside the pocket 200 are prevented from escaping the wireless charging pouch 10 and causing radiation harm to the user of the wireless charging pouch 10 (i.e. the wallet). In one embodiment, the radiation blocking enables blocking of radiation signals having a frequency within a predefined range of 1 Hz up to 50 GHz and above.

In some embodiment, a mobile-based application or a Mobile App (not shown in figures) may be provided on the user's mobile phone (i.e. portable electronic device) capable of communicating with the wireless charging device 10. The Mobile App may notify the user the charging status associated to the battery of the user's mobile phone. Further, the Mobile App may indicate required charging/discharging times of the battery of the user's mobile phone and the battery temperature of the user's mobile phone. This may enable the user to gauge the charging time required with both the wireless charging and non-wireless charging methods from the pouch 10, or any other charging docking station or a cable. The temperature gauge may further enable the user to understand if its phone is overheating with visual and/or audio notification to shut the phone down. The Mobile App may be linked via Bluetooth or the GSM module 96 or other tracking protocols to enable the mobile phone to track and communicate with the wireless charging pouch 10 and vice versa. Further, tracking of multiple pouches is also possible by linking the Mobile App with the multiple pouches.

Although only a pouch has been referenced to and described in the various embodiments in this application, it must be understood that the reference to the "pouch" can be extended to any small bag-like containers such as, but not limited to, a purse, a wallet and a clutch etc. The pouch 10 may preferred to be of a flat configuration, particularly, where there is at least one pair of opposing sides substantially parallel to each other. The pouch 10 may have an overall thickness such that when the at least one portable electronic device 100 is arranged outside the pouch 10 adjacent a side of the pouch 10, the portable electronic device 100 is within the effective transmission distance from the transmitting unit 40. Preferably, the pouch 10 may be of a size substantially similar to a size of a portable electronic device 100, so that a snug fitting of the portable electronic device 100 when accommodated within the pouch 10, and that a close contact between the inductive transmission active surface 102 of the portable electronic device 100 and the transmitting unit 40 can be achieved to thereby allowing the inductive charging between the pouch 10 and the portable electronic device 100 at an optimum efficiency.

It must be understood from the disclosure that the energy transfer amongst the charging coils of the docking charging station 50 and the receiving unit 30 as-well-as the charging coils of the transmitting unit 40 and the portable electronic device 100 is enabled via an electromagnetic induction or an inductive charging. In an embodiment of the present application, the inductive charging is in accordance with Qi Standard; however, the present application also supports the inductive charging using magnetic resonance coupling. In another embodiment, the energy transfer amongst the devices may be enabled through direct coupling by touching two metal plates using magnets.

As widely known, the inductive charging includes utilizing an electromagnetic field for facilitating energy transfer amongst two or more objects through the electromagnetic induction. Typically, an induction charger uses a first induction coil (a transmitter coil) to create an alternating electromagnetic field within a charging base. When a second induction coil (a receiver coil) in the electronic device is in proximity of the first induction coil, the second induction coil receives power from the electromagnetic field and converts the power into an electric current to charge a battery of the electronic device. It is to be noted that the first induction coil in proximity with the second induction coil forms a transformer. The electromagnetic field generated by the first induction coil (also referred as a primary coil) is radiated equally in all directions. It is to be noted that the magnetic flux drops rapidly with distance. Therefore, the second induction coil (also referred as a secondary coil) must be positioned as-close-as possible to the first induction coil (i.e. the primary coil) to intercept the magnetic flux generated due to the electromagnetic field. The efficiency of the energy transferred from the primary coil to the secondary coil is based upon a coupling factor between the primary coil and the secondary coil. The coupling factor may further depend upon alignment of the two coils, separation of the two coils and the size of the two coils. In a scenario, wherein the entire flux generated by the primary coil is captured by the secondary coil, the coupling factor between the two coils is determined to be 1 (maximum coupling factor).

In one embodiment, as described above, the wireless charging may be in accordance with Qi standard specification proposed by Wireless Power Consortium and adopted by The Alliance for Wireless Power (A4WP) and the Power Matters Alliance (PMA). However, in the inductive charging systems, it is observed that the magnetic flux intensity drops reasonably as a result of large separation distance between the primary coil and the secondary coil thereby affecting the energy transfer efficiency. In a resonant inductive coupling, larger distances between the first induction coil and the second induction coil may be achieved. In the resonant inductive coupling, the power/energy may be transferred between coils operating at identical resonant frequencies determined based upon factors including coils' distributed capacitance, resistance and inductance. The resonant inductive coupling is considered as inductive since it too involves oscillating magnetic field generated by the primary coil thereby inducing a current in the secondary coil. The technical advantage of the resonant inductive coupling is the strong coupling established between the primary coil and the secondary coil.

In the resonant inductive charging systems, the energy is transferred from the primary coil to the secondary coil instead of spreading omni directionally from the primary coil. The result is that, although energy attenuates to some degree with distance, the primary source of attenuation is the Q-factor (gain bandwidth) of the coils. The Q-factor may be substantially improved in order to obtain higher energy transfer. The resonant energy transfer is not so reliant on the coils being in the same orientation (providing that the secondary coil presents a large enough cross section to the primary coil so that in each cycle it absorbs more energy than is lost by the primary). A further advantage of the resonant inductive charging is ability to transfer power between a single primary coil and multiple secondary coils. Though the resonant inductive coupling overcomes the requirement of closely coupled coils, however, the resonant inductive coupling face a technical drawback of relatively low efficiency due to flux leakage, greater circuit complexity, high operating frequencies and potential electromagnetic interference (EMI). Qi standard specification prescribes the resonant inductive charging which is also adopted by The Alliance for Wireless Power (A4WP).

Referring to FIGS. 10(*a*) and 10(*b*) illustrates wireless charging implementations in inductive mode and resonant mode respectively. As shown in FIG. 10(*a*), the wireless charging in the inductive mode requires a tight coupling between the transmitter coil and the receiver coil. In the tight coupling, the transmitting unit containing the transmitter coil is adapted to operate at a different frequency from that of the receiving unit containing the receiver coil. Such variation in the frequencies results in obtaining efficient power output. As can be seen from FIG. 10(*a*), the transmitter coil and the receiver coil are tightly coupled when both the transmitter coil and the receiver coil are of same size and the distance between the coils is less than the diameter of both the coils. As shown in FIG. 10(*b*), the wireless charging in the resonant mode requires a loose coupling between the transmitter coil and the receiver coil. In the loose coupling, the transmitting unit containing the transmitter coil is adapted to operate at a same resonant frequency as that of the receiving unit containing the receiver coil. As can be seen from FIG. 10(*b*), the transmitter coil is at a larger distance from the receiver coil. Specifically, the distance between the coils is equal to the diameter of the coils, wherein the coils are of same size and same diameter. Due to increase in the distance between the transmitter coil and the receiver coil, the magnetic coupling between the transmitter coil and the receiver coil is decreased thereby resulting in reduction of the coupling factor between the transmitter coil and the receiver coil. In such scenario, both the transmitting unit and the receiving unit are adapted to operate at the same resonant frequency. In the recently developed resonant systems, a movable transmission coil (i.e. mounted on an elevating platform or arm) and the receiver coil made of silver plated copper or aluminum is provided to minimize weight and decrease resistance due to the skin effect.

In accordance with embodiments of the present application, the second set of charging coils 52 within the docking charging station 50 may create an electromagnetic field. The first set of charging coils 32 within the wireless charging device 10 may receive electric power from the electromagnetic field as-soon-as the first set of charging coils 32 are within the proximity of the second set of charging coils 52. The electric power may be converted into an electric current which is stored in the rechargeable battery 60 of the wireless charging device 10. The electric current stored in the rechargeable battery 60 may be utilized by the third set of charging coils 42 within the wireless charging device 10 to create an electromagnetic field. When the fourth set of charging coils of the portable electronic device 100 is within the proximity of the third set of charging coils 42, the fourth set of charging coils extracts electric power from the electromagnetic field and converts the electric power to an electric current for charging the one or more batteries of the portable electronic device 100. Thus, the present wireless charging device 10 works based on the electromagnetic induction, wherein an electromagnetic field interacts with an electric circuit to generate an electromotive force (EMF) that induces an electric current.

Exemplary embodiments discussed above may provide certain advantages. Though not required to practice aspects of the application, these advantages may include those provided by the following features.

Some embodiments of the present application enable a wireless charging pouch in form of a wallet or a purse or a clutch capable of wirelessly charging one or more portable devices within an effective transmission distance from the wireless charging pouch.

Some embodiments of the present application enable a wireless charging pouch capable of wirelessly charging one or more portable devices placed either on top of the wireless charging pouch or inside the wireless charging pouch or outside the wireless charging pouch adjacent to one of the sides of the wireless charging pouch.

Some embodiments of the present application enable the wireless charging pouch being constructed without use of any external stitching means thereby making repairs to the battery assembly within the charging pouch possible.

Some embodiments of the present application enable the wireless charging pouch provided with multiple indicating means performing dual role of indicating operating status of the battery assembly as-well-as illuminating the wireless charging pouch for decorative purposes.

Although implementations for a wireless charging device and method for facilitating wireless charging of one or more portable electronic devices have been described in language specific to structural features and/or methods, it is to be understood that the appended claims are not necessarily limited to the specific features or methods described. Rather, the specific features and methods are disclosed as examples of implementations for facilitating wireless charging of one or more portable electronic devices.

What is claimed is:

1. A wireless charging device, comprising:

a battery assembly further comprising a receiving unit and a transmitting unit, the receiving unit being electrically coupled with the transmitting unit, wherein:

the receiving unit is configured to wirelessly receive, via an electromagnetic induction, electrical energy from an external power source, wherein the electrical energy is received by a first set of charging coils within the receiving unit from a second set of charging coils within the external power source, and the transmitting unit is configured to wirelessly transmit, via an electromagnetic induction, the electrical energy received by the receiving unit to one or more portable electronic devices positioned within a predetermined transmission distance from the transmitting unit, and wherein the transmitting unit transmits the electrical energy, via a third set of charging coils within the transmitting unit, to a fourth set of charging coils within the one or more portable electronic devices thereby facilitating charging of one or more batteries of the one or more portable electronic devices.

2. The wireless charging device of claim 1, wherein the wireless charging device is a charging pouch in form of a purse or a wallet or a clutch.

3. The wireless charging device of claim 1, wherein the external power source is a docking charging station of a type including an inductive power transmitter or a magnetic resonance transmitter, and wherein the station external power source is powered via one of an AC power source or a USB power connection.

4. The wireless charging device of claim 1, wherein the one or more portable electronic devices are selected from smartphones, portable computing devices, tablet computers, and wearables.

5. The wireless charging device of claim 4, wherein the one or more portable electronic devices are positioned:

internally within the wireless charging device, or externally adjacent to one of the sides of the wireless charging device or on top of the wireless charging device charging device.

6. The wireless charging device of claim 5, wherein the wireless charging device is having a thickness such that the one or more portable electronic devices positioned adjacent to one of the sides of the wireless charging device are within the predetermined transmission distance from the transmitting unit of the wireless charging device.

7. The wireless charging device of claim 6, wherein the predetermined transmission distance is based upon specification requirements of at least one of the transmitting unit and the or more portable electronic devices.

8. The wireless charging device of claim 1, wherein the receiving unit and the transmitting unit comprises one or more reflective plates adapted for controlling direction of the electrical energy transmitted.

9. The wireless charging device of claim 8, wherein the battery assembly further comprises a rechargeable battery configured to store the electrical energy received by the receiving unit, wherein the rechargeable battery is a lithium rechargeable battery or a graphene rechargeable battery.

10. The wireless charging device of claim 9, wherein the receiving unit, the transmitting unit and the rechargeable battery are collectively wrapped within heat resistant packaging device thereby reducing transfer of heat generated within the wireless charging device.

11. The wireless charging device of claim 10, wherein the battery assembly further comprises a control unit configured to control the receipt of electrical energy by the receiving unit from the external source thereby enabling recharging of the rechargeable battery.

12. The wireless charging device of claim 11, wherein the control unit is further configured to control the transmission of electrical energy by the transmitting unit to the one or more portable electronic devices thereby enabling recharging of the one or more portable electronic devices.

13. The wireless charging device of claim 12, wherein the control unit further comprises a battery level sensor, a temperature sensor, and an object detection sensor, wherein the battery level sensor is adapted to automatically switch ON/OFF the battery assembly, and wherein the temperature sensor is adapted to monitor the temperature within the battery assembly thereby preventing overheating of the battery assembly, and wherein the object detection sensor is adapted to prevent transmission of electrical energy to other objects within the wireless charging device.

14. The wireless charging device of claim 13, wherein the control unit further comprises a communication module enabling the wireless charging device to wirelessly communicate with the one or more portable electronic devices, or external computing systems or external computer networks via a wireless communication technique.

15. The wireless charging device of claim 11, wherein the battery assembly further comprises an auxiliary control unit further comprising a memory unit, data synchronizing module, a GPS module, and a temperature control unit.

16. The wireless charging device of claim 15, wherein the memory unit is configured to store data, and wherein the data synchronizing module is configured to synchronize data between the one or more portable electronic devices and the memory unit, and wherein the GPS module is configured to locate or position an electronic item, and wherein the temperature control unit is configured to control heating or cooling of the battery assembly.

17. The wireless charging device of claim 16 further comprising an indicating means to indicate a defined orientation of the one or more portable electronic devices such that the one or more portable electronic devices are appropriately positioned and orientated relative to the transmitting unit for facilitating effective transmission.

18. The wireless charging device of claim 17, wherein the one or more portable electronic devices are positioned on the wireless charging device such that an inductive transmission active surface of the one or more portable electronic devices is within a proximity of the transmitting unit.

19. The wireless charging device of claim 17, wherein the wireless charging device further comprises a compartment between the receiving unit and the transmitting unit, wherein the compartment is capable of accommodating items, wherein the accommodation of the items in the compartments facilitates in avoiding interference between the receiving unit and the transmitting unit.

20. A method for facilitating wireless charging of one or more portable electronic devices, the method comprising:

providing a wireless charging device further comprising a receiving unit and a transmitting unit, wherein the receiving unit is electrically coupled with the transmitting unit;

wirelessly receiving, by the receiving unit, electrical energy from an external power source via an electromagnetic induction, wherein the electrical energy is received by a first set of charging coils within the receiving unit from a second set of charging coils within the external power source; and wirelessly transmitting, by the transmitting unit, the electrical energy received by the receiving unit to one or more portable electronic devices, via an electromagnetic induction, positioned within a predetermined transmission distance from the transmitting unit, and wherein the electrical energy is transmitted via a third set of charging coils, within the transmitting unit, to a fourth set of charging coils within the one or more portable electronic devices thereby facilitating charging of one or more batteries of the one or more portable electronic devices.

* * * * *